US012567126B2

(12) United States Patent
Ali et al.

(10) Patent No.: US 12,567,126 B2
(45) Date of Patent: Mar. 3, 2026

(54) INFRASTRUCTURE-SUPPORTED PERCEPTION SYSTEM FOR CONNECTED VEHICLE APPLICATIONS

(71) Applicant: GM Global Technology Operations LLC, Detroit, MI (US)

(72) Inventors: Kamran Ali, Troy, MI (US); Bo Yu, Troy, MI (US); Hariharan Krishnan, Troy, MI (US); Fan Bai, Ann Arbor, MI (US); Vivek Vijaya Kumar, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 382 days.

(21) Appl. No.: 18/297,870

(22) Filed: Apr. 10, 2023

(65) Prior Publication Data

US 2024/0338793 A1 Oct. 10, 2024

(51) Int. Cl.
*G06T 3/4053* (2024.01)
*G06T 3/4046* (2024.01)
*G06T 7/20* (2017.01)
(52) U.S. Cl.
CPC .......... *G06T 3/4053* (2013.01); *G06T 3/4046* (2013.01); *G06T 7/20* (2013.01); *G06T 2207/10028* (2013.01); *G06T 2207/10044* (2013.01); *G06T 2207/20084* (2013.01); *G06T 2207/30236* (2013.01)
(58) Field of Classification Search
None
See application file for complete search history.

(56) References Cited

U.S. PATENT DOCUMENTS 12,335,664 B2 * 6/2025 Ali .......................... G06N 20/00
12,394,262 B2 * 8/2025 Niu .......................... G07C 5/008
(Continued)

OTHER PUBLICATIONS

K. Ali et al., "Raven: Vision-Based Connected Vehicle Safety Platform Using Infrastructure Sensing, 5G, and MEC," in IEEE Transactions on Vehicular Technology, vol. 73, No. 11, pp. 17290-17304, Nov. 2024, doi: 10.1109/TVT.2024.3430815. (Year: 2024).*
(Continued)

*Primary Examiner* — David Orange
(74) *Attorney, Agent, or Firm* — Vivacqua Crane, PLLC

(57) ABSTRACT

An infrastructure-supported perception system for connected vehicle applications includes one or more infrastructure perception sensors that capture perception data having a reduced resolution and a reduced frame rate. The reduced resolution includes a reduced number of pixels for a given frame when compared to a standard resolution and the reduced frame rate captures data at a lower rate when compared to a standard frame rate. The infrastructure-supported perception system includes one or more controllers that are part of a connected vehicle. The controllers of the connected vehicle are in wireless communication with the one or more infrastructure perception sensors and one or more servers, and the one or more servers are in wireless communication with the one or more infrastructure perception sensors. The controllers receive dynamic information regarding one or more detected objects in an environment surrounding the connected vehicle from the one or more servers.

14 Claims, 3 Drawing Sheets

(56) References Cited

U.S. PATENT DOCUMENTS

| | | | | |
|---|---|---|---|---|
| 2020/0370890 A1* | 11/2020 | Hamilton | ............... | G08G 1/04 |
| 2021/0224556 A1* | 7/2021 | Xu | ...................... | G05D 1/0221 |

OTHER PUBLICATIONS

Dr. Muhammad Rohen's Linkedin profile as of Aug. 19, 2025 (Year: 2025).*

Author biographies for the Raven paper, retrieved from https://ieeexplore.ieee.org/abstract/document/10605068 (Year: 2024).*

"Connected Vehicles 101" U.S. Department of Transportation, Jul. 2018, pp. 1-31, USDOT, Washington, D.C., US.

"Dedicated Short Range Communications (DSRC) Service", Federal Communications Commission—Mobility Division, Sep. 30, 2022, Federal Communications Commission, Washington, D.C., U.S.

"GStreamer—open source multimedia framework", GStreamer Team, Jan. 11, 2001.

"Introduction to Cellular V2X", Qualcomm Technologies, 2019, pp. 1-23, Qualcomm, San Diego, California, U.S.

"ZeroMQ—An open-source universal messaging library", iMatix, 2007.

Alleven, M., "Report: DSRC mandate moving off the table for automakers", FierceWireless, Nov. 1, 2017, Telecom Group, Washington, D.C., US.

Ananthanarayanan, G. et al., "Demo: Video Analytics—Killer App for Edge Computing", MobiSys '19: Proceedings of the 17th Annual International Conference on Mobile Systems, Applications, and Services, Jun. 2019, pp. 695-696, Association for Computing Machinery, New York, NY, United States.

Antonakoglou, K. et al., "On the Needs and Requirements Arising from Connected and Automated Driving", Journal of Sensor and Actuator Networks, May 15, 2020, vol. 9, Issue 2, Multidisciplinary Digital Publishing Institute, Basel, Switzerland.

Bochkovskiy, A. et al., "YOLOv4: Optimal Speed and Accuracy of Object Detection", arXiv:2004.10934, Apr. 23, 2020.

Brehon-Grataloup, L. et al., "Mobile edge computing for V2X architectures and applications: A survey", Computer Networks, Apr. 7, 2022, vol. 206, Elsevier, Amsterdam, Netherlands.

Brostrom, M., "Real-time multi-object, segmentation and pose tracking using Yolov8 | Yolo-NAS with DeepOCSORT and LightMBN", Zenodo, European Organization for Nuclear Research, Meyrin, Geneva, Switzerland.

Canel, C. et al., "Scaling Video Analytics on Constrained Edge Nodes", 2nd SysML Conference, May 2019, Cornell University, Ithaca, NY, US.

Cao, J. et al., "Observation-Centric SORT: Rethinking SORT for Robust Multi-Object Tracking", IEEE/CVF Conference on Computer Vision and Pattern Recognition, Aug. 22, 2023, Institute of Electrical and Electronics Engineers, Vancouver, BC, Canada.

Gavilanes Castillo, G. et al., "Latency assessment of an ITS safety application prototype for protecting crossing pedestrians", 2020 IEEE 91st Vehicular Technology Conference, Jun. 30, 2020, Institute of Electrical and Electronics Engineers, Antwerp, Belgium.

Coll-Perales, B. et al., "End-to-End V2X Latency Modeling and Analysis in 5G Networks", IEEE Transactions on Vehicular Technology, Nov. 25, 2022, pp. 5094-5109, vol. 72, Issue 4, Institute of Electrical and Electronics Engineers, New York City, NY, US.

Du, Y. et al., "StrongSORT: Make DeepSORT Great Again", IEEE Transactions on Multimedia, Jan. 31, 2023, pp. 1-14, Institute of Electrical and Electronics Engineers, New York City, NY, US.

Emara, M. et al., "MEC-assisted End-to-End Latency Evaluations for C-V2X Communications", 2018 European Conference on Networks and Communications, Aug. 23, 2018, Institute of Electrical and Electronics Engineers, Ljubljana, Slovenia.

Fu, X. et al., EdgeWise: A Better Stream Processing Engine for the Edge, USENIX Annual Technical Conference, Jul. 1, 2019, pp. 925-945, National Science Foundation, Alexandria, Virginia, U.S.

Grammatikos, P. et al., "A Mobile Edge Computing Approach for Vehicle to Everything Communications", SRP Communications and Network, Aug. 30, 2019, pp. 65-81, Scientific Research Publishing, Wuhan, China.

Guist, F. et al., "MEC Deployments in 4G and Evolution Towards SG", ETSI White Paper No. 24, Feb. 2018, European Telecommunications Standards Institute, Sophia-Antipolis, France.

Guist, F. et al., "Multi-access Edge Computing: The driver behind the wheel of 5G-connected cars", IEEE Communications Standards Magazine, Sep. 2018, pp. 66-73, vol. 2, Issue 3, Institute of Electrical and Electronics Engineers, New York City, NY, US.

Guo, J. et al., "Context-aware object detection for vehicular networks based on edge-cloud cooperation", IEEE IoT Journal, Jul. 2020, pp. 5783-5791, Institute of Electrical and Electronics Engineers, New York City, NY, US.

Hung, W. et al., "An NFV-Based Edge Platform for Low-Latency V2X Services Supporting Vehicle Mobility-Driven Auto Scaling", 2021 International Wireless Communications and Mobile Computing, Aug. 9, 2021, Institute of Electrical and Electronics Engineers, Harbin City, China.

Jiang, J. et al., "Chameleon: Scalable Adaptation of Video Analytics", SIGCOMM '18: Proceedings of the 2018 Conference of the ACM Special Interest Group on Data Communication, Aug. 2018, pp. 253-266, Association for Computing Machinery, New York, NY, United States.

Kanavos, A. et al., "V2X Communication over Cellular Networks: Capabilities and Challenges", Telecom, Jan. 13, 2021, pp. 1-26, Multidisciplinary Digital Publishing Institute, Basel, Switzerland.

Kekki, S. et al., "MEC in 5G Networks", ETSI White Paper, Jun. 2018, pp. 1-28, vol. 28, European Telecommunications Standards Institute, Sophia-Antipolis, France.

Le Nguyen, P. et al., "Modeling and Minimizing Latency in Three-tier V2X Networks", IEEE GLOBECOM, Feb. 11, 2021, Institute of Electrical and Electronics Engineers, Taipei, Taiwan.

Lee, K. et al., "Latency of Cellular-based V2X: Perspectives on TTI-proportional-latency and TTI-independent-latency", IEEE Access, Jul. 25, 2017, pp. 1-9, vol. 5, Institute of Electrical and Electronics Engineers, New York City, NY, US.

Lei, M. et al., "Integrated Sensor Fusion Based on 4D MIMO Radar and Camera", IEEE Vehicular Technology Magazine, Oct. 10, 2022, pp. 38-46, vol. 17, Issue 4, Institute of Electrical and Electronics Engineers, New York City, NY, US.

Lin, S. et al., "SD-VEC: Software-Defined Vehicular Edge Computing with Ultra-Low Latency", IEEE Communications Magazine, Dec. 2021, pp. 1-7, vol. 59, Institute of Electrical and Electronics Engineers, New York City, NY, US.

Liu, L. et al., "Edge Assisted Real-time Object Detection for Mobile Augmented Reality", MobiCom '19: The 25th Annual International Conference on Mobile Computing and Networking, Aug. 2019, pp. 1-16, Association for Computing Machinery, New York, NY, United States.

Liu, Q. et al., "Fast and accurate object analysis at the edge for mobile augmented reality: demo", Proceedings of the Second ACM/IEEE Symposium on Edge Computing, Oct. 12, 2017, pp. 1-2, Association for Computing Machinery, New York City, NY, US.

Martin-Sacristan, D. et al., "Evaluation of LTE-Advanced Connectivity Options for the Provisioning of V2X Services", IEEE Wireless Communications and Networking Conference, Jun. 11, 2018, Institute of Electrical and Electronics Engineers, Barcelona, Spain.

Ran, X. et al., "DeepDecision: A Mobile Deep Learning Framework for Edge Video Analytics", IEEE INFOCOM 2018, Oct. 11, 2018, Institute of Electrical and Electronics Engineers, Honolulu, HI, USA.

Singer, D. et al., "A General Mechanism for RTP Header Extensions", Internet Engineering Task Force, Oct. 2017, pp. 1-25, Internet Engineering Steering Group, Cupertino, CA, US.

Srinivasa, R. et al., "Minimizing Latency for 5G Multimedia and V2X Applications using Mobile Edge Computing", 2nd International Conference on Intelligent Communication and Computational Techniques, Sep. 29, 2019, pp. 213-217, Institute of Electrical and Electronics Engineers, New York City, NY, US.

Tang, Z. et al., "CityFlow: A City-Scale Benchmark for Multi-Target Multi-Camera Vehicle Tracking and Re-Identification", IEEE/

(56) References Cited

OTHER PUBLICATIONS

CVF Conference on Computer Vision and Pattern Recognition, Jan. 9, 2020, Institute of Electrical and Electronics Engineers, Long Beach, CA, USA.

Tang, Z. et al., "Single-camera and inter-camera vehicle tracking and 3D speed estimation based on fusion of visual and semantic features", IEEE/CVF Conference on Computer Vision and Pattern Recognition Workshops, Dec. 16, 2018, Institute of Electrical and Electronics Engineers, Salt Lake City, UT, USA.

Tong, P. et al., "Large-scale vehicle trajectory reconstruction with camera sensing network", MobiCom '21: Proceedings of the 27th Annual International Conference on Mobile Computing and Networking, Oct. 2021, pp. 188-200, Association for Computing Machinery, New York, NY, United States.

Vazquez-Gallego, F. et al., "Demo: A Mobile Edge Computing-based Collision Avoidance System for Future Vehicular Networks", IEEE INFOCOM Conference, Sep. 23, 2019, Paris, France.

Wojke, N. et al., "Simple Online and Realtime Tracking With a Deep Association Metric", 2017 IEEE International Conference on Image Processing, Feb. 22, 2018, Institute of Electrical and Electronics Engineers, Beijing, China.

Yi, S. et al., "LAVEA: Latency-aware Video Analytics on Edge Computing Platform", IEEE 37th International Conference on Distributed Computing Systems, Jul. 17, 2017, pp. 2573-2574, Institute of Electrical and Electronics Engineers, Atlanta, GA, USA.

Zhang, H. et al., "Live Video Analytics at Scale with Approximation and Delay-Tolerance", NSDI'17: Proceedings of the 14th USENIX Conference on Networked Systems Design and Implementation, Mar. 2017, pp. 377-392, USENIX Association, Berkeley, California, United States.

Zhang, W. et al., "Latency Prediction for Delay-sensitive V2X Applications in Mobile Cloud/Edge Computing Systems", GLOBECOM 2020—2020 IEEE Global Communications Conference, Feb. 15, 2021, Institute of Electrical and Electronics Engineers, Taipei, Taiwan.

Zhang, Y. et al., "Byte Track: Multi-Object Tracking by Associating Every Detection Box", Computer Vision—ECCV 2022: 17th European Conference, Oct. 23, 2022, pp. 1-21, Springer-Verlag Berlin, Heidelberg, Germany.

Zhou, K. et al., "Omni-Scale Feature Learning for Person Re-Identification", 2019 IEEE/CVF International Conference on Computer Vision, Feb. 27, 2020, Institute of Electrical and Electronics Engineers, Seoul, South Korea.

* cited by examiner

INFRASTRUCTURE-SUPPORTED PERCEPTION SYSTEM FOR CONNECTED VEHICLE APPLICATIONS

INTRODUCTION

The present disclosure relates to an infrastructure-supported perception system for connected vehicle applications that reduces an end-to-end latency between one or more infrastructure perception sensors and a connected vehicle.

An autonomous vehicle executes various tasks such as, but not limited to, perception, localization, mapping, path planning, decision making, and motion control. For example, autonomous vehicles may include perception sensors such as a camera for collecting image data regarding the environment surrounding the vehicle. In addition to the on-board perception sensors, autonomous vehicles may also be provided with perception data collected by sensors that are installed as part of the roadside infrastructure such as, for example, radar, LiDAR, or a camera. However, processing the perception data collected by the perception sensors may require significant computing resources, which may not be available as part of the existing roadside infrastructure. Furthermore, it is also to be appreciated that some autonomous vehicles may also have limited computing resources that make it challenging to execute various tasks to process the perception data collected by the roadside perception sensors.

In one approach to alleviate the issues faced with limited computing resources, a cloud or edge server may be provided to process the perception data collected by the roadside perception sensors. The processed perception data is then transmitted to subscribed clients, such as the autonomous vehicle, over a wireless network. However, offloading the raw perception data to the edge server for processing may introduce significant end-to-end latency between the infrastructure perception sensor and the autonomous vehicle. It is to be appreciated that advanced driver assistance system (ADAS) applications may have a high degree of latency sensitivity. For example, some ADAS applications may have latency requirements of under 150 milliseconds. In some instances, it may not be possible for the edge server to process the raw perception data quickly enough to meet the latency requirements of some ADAS applications.

Thus, while computer perception systems for autonomous vehicles achieve their intended purpose, there is a need in the art for an improved approach for transmitting processed perception data to the autonomous vehicle with improved latency.

SUMMARY

According to several aspects, an infrastructure-supported perception system for connected vehicle applications is disclosed. The infrastructure-supported perception system includes one or more infrastructure perception sensors that capture perception data having a reduced resolution and a reduced frame rate, where the reduced resolution includes a reduced number of data points for a given frame when compared to a standard resolution and the reduced frame rate captures data at a lower rate when compared to a standard frame rate. The infrastructure-supported perception system also includes one or more controllers that are part of a connected vehicle, the one or more controllers of the connected vehicle in wireless communication with the one or more infrastructure perception sensors and one or more servers, where the one or more servers are in wireless communication with the one or more infrastructure perception sensors. The one or more controllers execute instructions to receive dynamic information regarding one or more detected objects in an environment surrounding the connected vehicle from the one or more servers. The dynamic information regarding is estimated by the one or more servers by executing one or more super-resolution algorithms to increase the resolution of the perception data from the reduced resolution to at least the standard resolution, and by executing one or more motion prediction algorithms to interpolate a position of one or more detected objects between frames collected at the reduced frame rate to compensate for a reduced number of frames that are collected by the one or more infrastructure perception sensors when compared to the standard frame rate.

In another aspect, the standard resolution results in lane-level accuracy when executing one or more object detection and tracking algorithms to detect one or more objects represented by the perception data collected by the infrastructure perception sensors.

In yet another aspect, the one or more super-resolution algorithms include a neural network trained for increasing the resolution of roadside objects.

In an aspect, the standard frame rate collected by the one or more infrastructure perception sensors results in lane-level accuracy when executing one or more object tracking algorithms to track the detected objects represented by the perception data collected by the infrastructure perception sensors.

In another aspect, the dynamic information regarding the one or more detected objects is packetized into a message format.

In yet another aspect, a plurality of messages each represent the dynamic information for a single detected object, and wherein each message is transmitted separately.

In an aspect, the one or more servers execute instructions to prioritize a plurality of messages that represent the dynamic information for the detected objects based on a relevance priority metric.

In another aspect, the relevance priority metric is determined by:

$$p_r = \frac{v}{d} \cdot \cos \theta \cdot e^{(\alpha |v - \mu_v|)}$$

where $p_r$ represents the relevance priority metric, $v$ represents a velocity of a particular detected object, $d$ represents a distance from the particular detected object to a point-of-interest, $\theta$ represents a heading angle with respect to the point-of-interest, $\mu_v$ represents a speed limit of a monitored roadway, $e$ represents Euler's number, and $\alpha$ is a predetermined constant.

In yet another aspect, the one or more infrastructure perception sensors include one or more of the following: a camera, a radar sensor, and a LIDAR sensor.

In an aspect, an infrastructure-supported perception system for connected vehicle applications is disclosed. The infrastructure-supported perception system includes one or more infrastructure perception sensors that capture perception data having a reduced resolution and a reduced frame rate, wherein the reduced resolution includes a reduced number of data points for a given frame when compared to a standard resolution and the reduced frame rate captures data at a lower rate when compared to a standard frame rate. The infrastructure-supported perception system also includes one or more controllers that are part of a connected vehicle. The one or more controllers of the connected vehicle is in wireless communication with the one or more infrastructure perception sensors and one or more servers. The one or more servers are in wireless communication with the one or more infrastructure perception sensors. The one or more controllers execute instructions to receive dynamic information regarding one or more detected objects in an environment surrounding the connected vehicle from the one or more servers. The dynamic information regarding is estimated by the one or more servers by executing one or more super-resolution algorithms to increase the resolution of the perception data from the reduced resolution to at least the standard resolution, and by executing one or more motion prediction algorithms to interpolate a position of one or more detected objects between frames collected at the reduced frame rate to compensate for a reduced number of frames that are collected by the one or more infrastructure perception sensors when compared to the standard frame rate, and by prioritizing a plurality of messages that represent the dynamic information for the detected objects based on a relevance priority metric.

In another aspect, the standard resolution results in lane-level accuracy when executing one or more object detection and tracking algorithms to detect one or more objects represented by the perception data collected by the infra-structure perception sensors.

In yet another aspect, the one or more super-resolution algorithms include a neural network trained for increasing the resolution of roadside objects.

In an aspect, the standard frame rate collected by the one or more infrastructure perception sensors results in lane-level accuracy when executing one or more object tracking algorithms to track the detected objects represented by the perception data collected by the infrastructure perception sensors.

In another aspect, the dynamic information regarding the one or more detected objects is packetized into a message format.

In yet another aspect, each of the plurality of messages represent the dynamic information for a single detected object, and wherein each message is transmitted separately.

In an aspect, the relevance priority metric is determined by:

$$p_r = \frac{v}{d} \cdot \cos\theta \cdot e^{(\alpha|v - \mu_v|)}$$

where $p_r$ represents the relevance priority metric, v represents a velocity of a particular detected object, d represents a distance from the particular detected object to a point-of-interest, $\theta$ represents a heading angle with respect to the point-of-interest, $\mu_v$ represents a speed limit of a monitored roadway, e represents Euler's number, and $\alpha$ is a predetermined constant.

In another aspect, an infrastructure-supported perception system for connected vehicle applications is disclosed. The infrastructure-supported perception system includes one or more infrastructure perception sensors in electronic communication with one or more infrastructure controllers, where the one or more infrastructure controllers capture perception data. The infrastructure-supported perception system also includes one or more controllers that are part of a connected vehicle. The one or more controllers of the connected vehicle is in wireless communication with one or more servers and one or more infrastructure perception sensors, where the one or more servers are in wireless communication with the one or more infrastructure controllers. The one or more controllers execute instructions to receive dynamic information regarding one or more detected objects in an environment surrounding the connected vehicle from the one or more servers. The one or more infrastructure controllers execute instructions to receive the perception data collected by the infrastructure perception sensor and attach an original captured timestamp and a frame identifier to one or more packets of each frame of the perception data based on a quality of service of a wireless connection between the one or more infrastructure controllers and the one or more servers.

In another aspect, a two-prong data-plane active probe measures the quality of service.

In yet another aspect, a first prong of the two-prong data-plane active probe is placed at the one or more infrastructure controllers and a second prong of the two-prong data-plane active probe is placed at the one or more servers.

In an aspect, the quality of service refers to one or more of the following: packet loss, end-to-end latency, jitter, and throughput.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
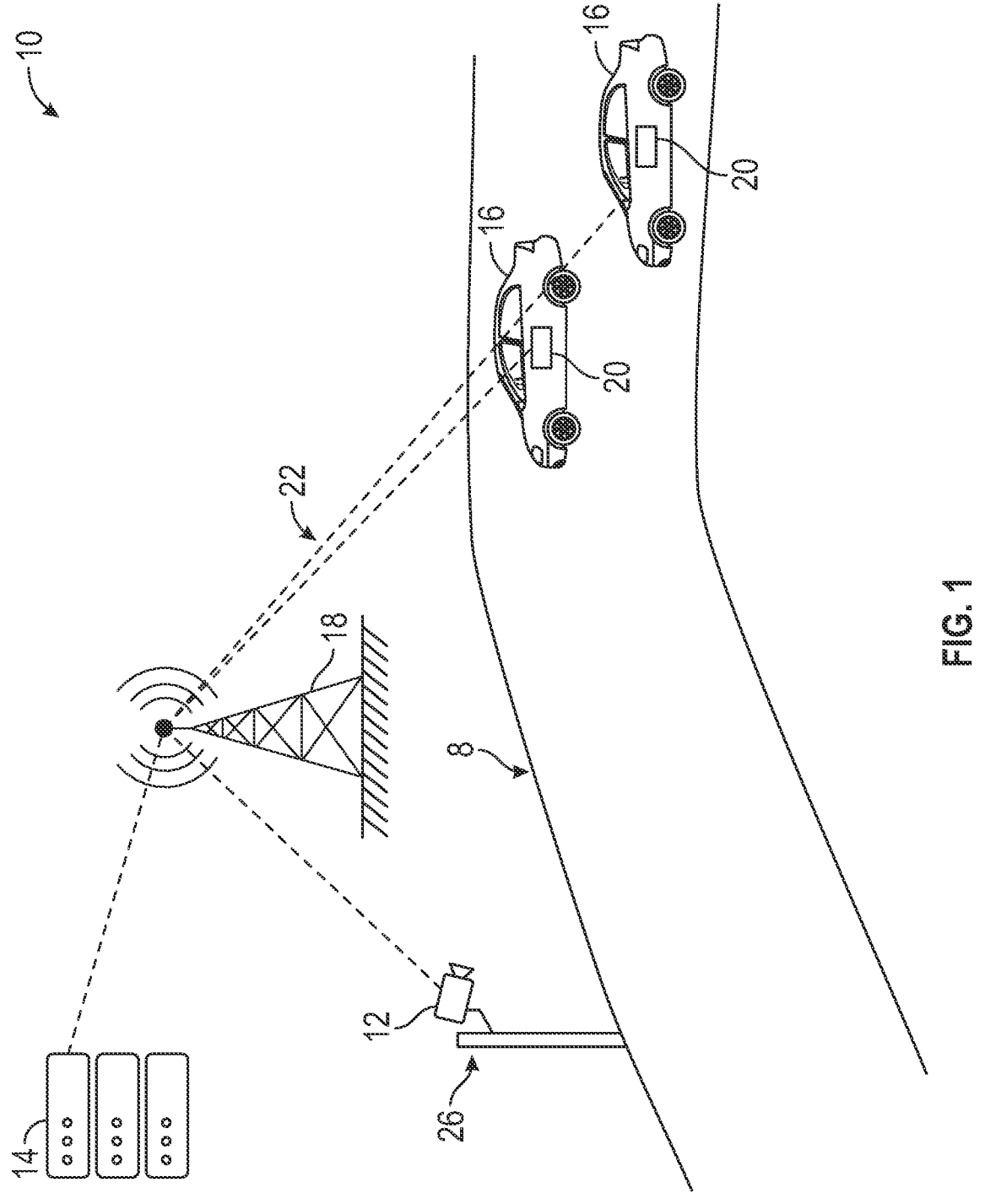
FIG. 1 is a schematic diagram of the disclosed infrastructure-supported perception system including one or more servers in wireless communication with one or more infrastructure perception sensors and one or more connected vehicles, according to an exemplary embodiment.

Referring to FIG. 1, an exemplary infrastructure-supported perception system 10 for a connected vehicle application is illustrated. The infrastructure-supported perception system 10 includes one or more infrastructure perception sensors 12 that collect perception data representing one or more objects located in an environment 8, where the perception data is transmitted wirelessly to one or more servers 14. The servers 14 process the perception data in real-time and transmit processed perception data to one or more connected vehicles 16. The one or more connected vehicles 16 may include any type of vehicle having wireless capabilities such as, but not limited to, a sedan, truck, sport utility vehicle, van, or motor home. The one or more connected vehicles 16 each include one or more controllers 20. In an embodiment, the one or more controllers 20 of each connected vehicle 16 are part of an automated driving system (ADS) or an advanced driver assistance system (ADAS) for assisting a driver with steering, braking, and/or accelerating. The infrastructure perception sensors 12 capture perception data of the environment 8 surrounding the one or more connected vehicles 16. In the embodiment as shown in FIG. 1, the infrastructure perception sensor 12 is a camera, however, it is to be appreciated that the infrastructure perception sensor 12 may also be a radar or a LiDAR sensor as well. In an example where a camera is employed, two-dimensional image data is collected. In an example where a radar sensor or a LIDAR sensor is employed, three-dimensional point radar point-cloud data is collected.

FIG. 1 illustrates the infrastructure perception sensors 12 and the servers 14 in wireless communication with one or more connected vehicles 16 by a wireless communication network 22 including one or more base stations 18. In one non-limiting embodiment, the infrastructure perception sensors 12 and the connected vehicles 16 are in wireless communication with one another by a cellular vehicle-to-everything (C-V2X) communication network. In an embodiment, the servers 14 are in wireless communication with the infrastructure perception sensor 12 and the connected vehicles 16 by a cellular communication protocol such as, for example, a fifth generation (5G) network. However, it is to be appreciated that FIG. 1 is merely exemplary in nature and other types of wireless communication protocols may be used as well.

The infrastructure perception sensors 12 are part of a roadside infrastructure 26 that collects traffic data. The infrastructure perception sensor 12 collects perception data representative of one or more objects located in the environment 8 surrounding the connected vehicles 16. The infrastructure perception sensors 12 are in electronic communication with one or more infrastructure controllers 24 (shown in FIG. 2), where the perception data collected by the infrastructure perception sensors 12 is transmitted to the one or more infrastructure controllers 24 over the wireless communication network 22. It is to be appreciated that in some instances the one or more infrastructure controllers 24 may have limited computing capabilities. Therefore, it may be challenging to execute computer perception tasks to analyze the perception data by the infrastructure controllers 24 quickly enough to meet the latency requirements of some ADAS applications that are executed by one or more of the connected vehicles 16. Accordingly, the computer perception tasks are offloaded to the servers 14 to meet the latency requirements of the ADAS applications executed by one or more of the connected vehicles 16.

Figure 2:
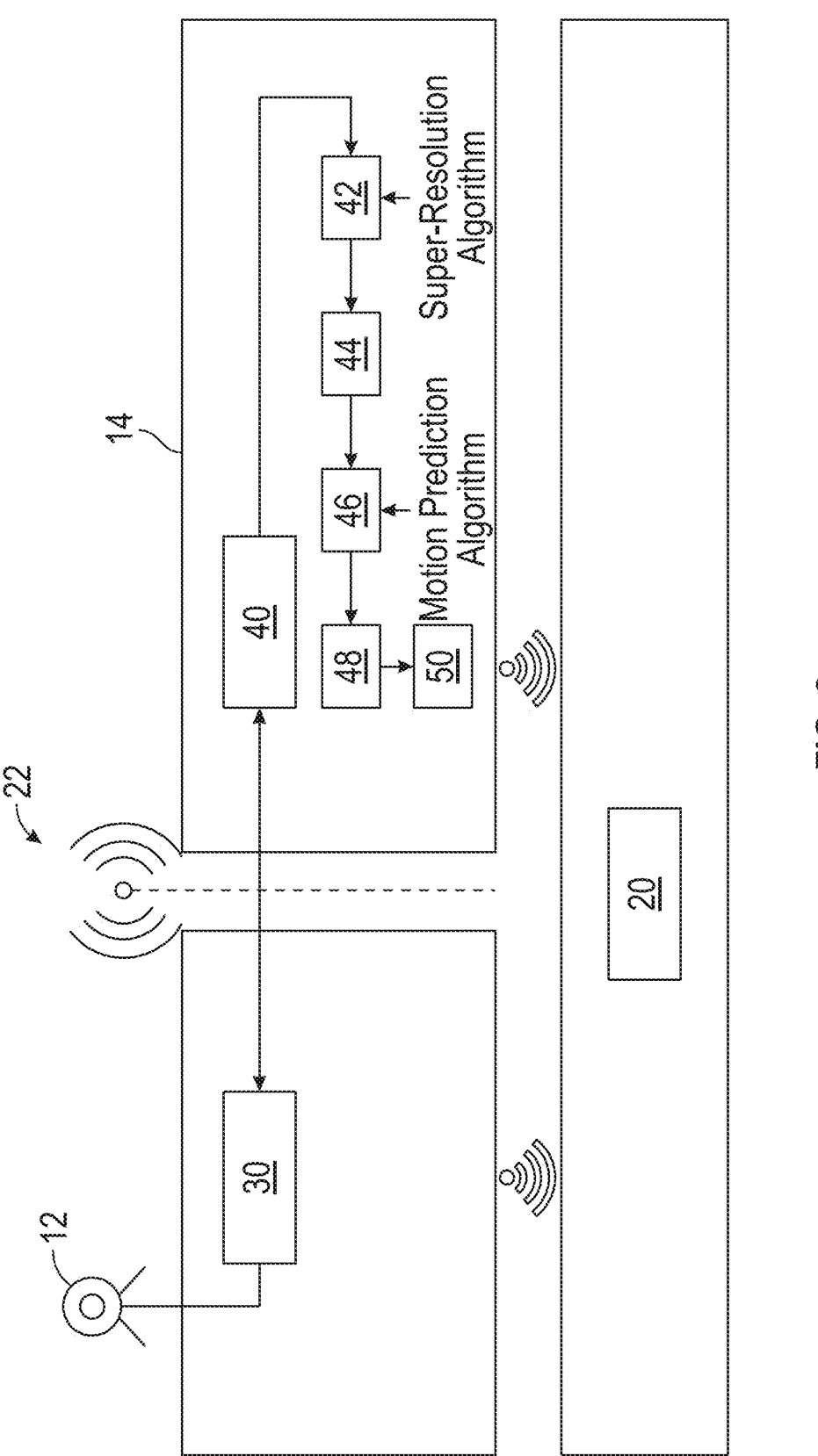
FIG. 2 is a block diagram illustrating the software architecture between one or more infrastructure controllers, the one or more servers, and one or more controllers of one of the connected vehicles, according to an exemplary embodiment.

Referring to FIGS. 1 and 2, the servers 14 may be any type of computing resource that is separate from the roadside infrastructure 26 and the one or more connected vehicles 16 such as, for example, an edge server. The servers 14 receive the perception data representative of one or more objects located in the environment 8 from the one or more infrastructure controllers 24 over the wireless communication network 22. The one or more servers 14 execute computer perception tasks that analyze the one or more objects represented by perception data collected by the infrastructure perception sensors 12. Specifically, the one or more servers 14 track the one or more objects, estimate dynamic information regarding the one or more objects, packetize the dynamic information regarding the one or more objects, place the dynamic information into a message format, and transmit the dynamic information regarding the one or more objects over the wireless communication network 22 to the controllers 20 of the one or more connected vehicles 16. It is to be appreciated that the disclosed infrastructure-supported perception system 10 provides reduced end-to-end latency between a sender (i.e., the infrastructure perception sensors 12) and a receiver (i.e., one of the connected vehicles 16) when compared to a system that performs the computer perception tasks in a centralized cloud or by the infrastructure controllers 24. As mentioned above, the infrastructure controllers may include limited computing capabilities.

FIG. 2 is a block diagram illustrating the software architecture for the servers 14, the one or more infrastructure controllers 24, and the one or more controllers 20 of one of the connected vehicles 16. The one or more infrastructure controllers 24 include a timestamp module 30. The one or more servers 14 include a parsing module 40, a super-resolution module 42, an object detection module 44, an object tracking module 46, a message module 48, and a priority queue module 50.

The timestamp module 30 of the one or more infrastructure controllers 24 receives the perception data collected by the infrastructure perception sensor 12 and attaches an original captured timestamp $t0$ and a frame identifier (ID) to one or more packets 62 of each frame 60 (shown in FIG. 3A) of the perception data based on a quality of service of a wireless connection between the one or more infrastructure controllers 24 and the one or more servers 14. It is to be appreciated that the quality of service may refer to one or more measurements of an overall performance of the wireless connection between the one or more infrastructure controllers 24 and the server 14 such as, but not limited to, packet loss, end-to-end latency, jitter, and throughput. In an embodiment, the perception data is transmitted as a video stream based on a real-time streaming protocol (RTSP), instead of sending the frames 60 individually.

A two-prong data-plane active probe measures the quality of service between the one or more infrastructure controllers 24 and the one or more servers 14. Specifically, a first prong of the two-prong data-plane active probe is placed at the timestamp module 30 of the one or more infrastructure controllers 24 and a second prong of the two-prong data-plane active probe is placed at the parsing module 40 of the one or more servers 14. It is to be appreciated that the two-prong data-plane active probe may employ uniform subsampling or, alternatively, adaptive subsampling to determine the quality of service. When employing adaptive subsampling, the two-prong data-plane active probe increases the sampling rate when the quality of service falls below a predetermined threshold, where the predetermined threshold may represent a minimum level of quality of service for a particular measurement of the overall performance of the wireless connection. It is to be appreciated that the two-prong data probe consumes communication resources, so it may be advantageous to increase the sampling rate when the quality of service falls below the predetermined threshold.

Figure 3A:
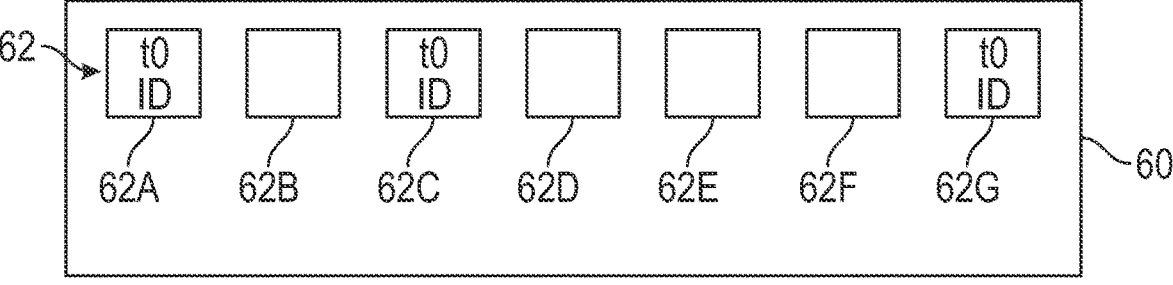
FIG. 3A is an illustration of an exemplary individual frame captured by the infrastructure perception sensor shown in FIG. 1 including a plurality of packets that are transmitted from the one or more infrastructure controllers to the one or more servers, according to an exemplary embodiment.
Figure 3B:
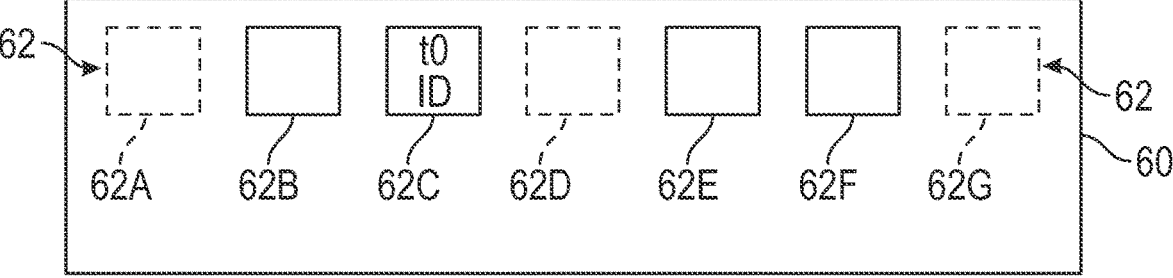
FIG. 3B is an illustration of the individual frame shown in FIG. 3A after the individual frame is transmitted to the one or more servers, according to an exemplary embodiment.

FIG. 3A is an illustration of an exemplary individual frame 60 including a plurality of packets 62, where the timestamp module 30 has attached an original captured timestamp $t0$ and a frame ID to the first packet 62A, a third packet 62C, and a seventh packet 62G based on the quality of service of the wireless connection between the one or more infrastructure controllers 24 and the one or more servers 14. FIG. 3B is an illustration of the same frame 60 shown in FIG. 3B, where the frame 60 is received by the parsing module 40 of the one or more servers 14 (FIG. 2). As seen in FIG. 3B, the first packet 62A, the third packet 62C, and the seventh packet 62G are lost in transmission as the frame 60 is sent from the one or more infrastructure controllers 24 and the one or more servers 14 over the wireless communication network 22, where the lost packets 62A, 62D, and 62G are illustrated in phantom line to show the loss. If all the packets 62 containing the original captured timestamp t0 and the frame identifier ID for a particular frame 60, then the servers 14 may skip processing the particular frame 60.

Referring to FIGS. 2, 3A, and 3B, as the quality of service increases the timestamp module 30 decreases a total number of packets 62 that are assigned an original captured timestamp t0 and frame identifier ID. Similarly, as the quality of service decreases the timestamp module 30 increases the total number of packets 62 that are assigned an original captured timestamp t0 and frame identifier ID. This is because as the quality of service increases with respect to packet loss, fewer packets 62 including the original captured timestamp t0 and the frame identifier ID are lost during transmission.

Referring to FIG. 2, the perception data collected by the infrastructure perception sensors 12 is then transmitted over the wireless communication network 22 to the parsing module 40 of the servers 14. The parsing module 40 of the servers 14 parse the plurality of packets 62 of each frame 60 (FIG. 3A) of the data stream transmitted by the one or more infrastructure controllers 24 to extract the frame identifier ID and the original captured timestamp t0 assigned to each frame 60. The perception data is then sent to the super-resolution module 42 of the one or more servers 14.

In an embodiment, the one or more infrastructure perception sensors 12 collect the perception data indicative of the environment 8 with a reduced resolution, where the reduced resolution includes a reduced number of data points for a given frame when compared to a standard resolution. For example, if the infrastructure perception sensor 12 is a camera, then the reduced resolution includes a reduced number of pixels. In another example, if the infrastructure perception sensor 12 is a radar sensor, then the reduced resolution includes a reduced number of radar points that are part of a radar point-cloud. The standard resolution represents the resolution that is collected by the one or more infrastructure perception sensors 12 during standard operating conditions. It is to be appreciated that the standard resolution collected by the one or more infrastructure perception sensors 12 results in lane-level accuracy when executing one or more object detection and tracking algorithms to detect the one or more objects represented by perception data collected by the infrastructure perception sensors 12.

The super-resolution module 42 of the servers 14 execute one or more super-resolution algorithms to increase the resolution of the perception data from the reduced resolution to at least the standard resolution. In one embodiment, the one or more super-resolution algorithms include a neural network trained specifically for increasing the resolution of the perception data for purposes of object detection. Specifically, the neural network is trained for increasing the resolution of roadside objects relevant for purposes of determining autonomous driving tasks. Some examples of roadside objects that are relevant when determining autonomous driving tasks include, but are not limited to, vehicles, motorcycles, bicycles, and pedestrians. One example of a neural network that is trained for increasing the resolution of roadside objects is a template-matching self-attention based super resolution technique. It is to be appreciated that transmitting the perception data with the reduced resolution over the wireless communication network 22 to the servers 14 and then executing one or more super-resolution techniques by the servers 14 to increase the resolution of the perception data to the standard perception resolution reduces the end-to-end latency between the infrastructure perception sensors 12 and one of the connected vehicles 16.

The perception data is then sent to the object detection module 44. The object detection module 44 executes one or more object detection algorithms to detect the one or more objects represented by the perception data captured by the infrastructure perception sensors 12. In one embodiment, the object detection algorithm assigns a bounding box around each detected object in a frame, and the object tracking module 46 assigns a unique identifier to each bounding box in a frame. One example of an object detection algorithm that may be utilized is the you only look once (YOLO) object detection algorithm, however, it is to be appreciated that other object tracking algorithms may be used as well.

The object tracking module 46 of the one or more servers 14 receives one or more detected objects from the object detection module 44 and assigns the unique identifier to each detected object in a frame. In an embodiment, the one or more infrastructure perception sensors 12 collect the perception data of the environment 8 with a reduced frame rate, where the reduced frame rate captures data at a lower rate when compared to a standard frame rate. The standard frame rate represents the frame rate that is collected by the one or more infrastructure perception sensors 12 during standard operating conditions. It is to be appreciated that the standard frame rate collected by the one or more infrastructure perception sensors 12 results in lane-level accuracy when executing one or more object tracking algorithms to track the detected objects represented by the perception data collected by the infrastructure perception sensors 12.

It is to be appreciated that the reduced frame rate results in a reduced number of frames collected by the one or more infrastructure perception sensors 12 when compared to the standard frame rate over the same length of time. For example, if the standard frame rate is 30 frames per second (FPS) and the reduced frame rate is 10 FPS, then the standard frame rate provides twenty more frames per second when compared to the reduced frame rate. The object tracking module 46 of the one or more servers 14 execute one or more motion prediction algorithms to interpolate a position of the one or more detected objects between frames collected at the reduced frame rate to compensate for the reduced number of frames that are collected by the one or more infrastructure perception sensors 12 when compared to the standard frame rate. For example, the motion prediction algorithm would interpolate the position of the one or more detected objects to compensate for collecting frames at 10 FPS instead of 30 FPS. One example of a motion prediction algorithm that may be used is a Kalman filter.

The object tracking module 46 of the one or more servers 14 estimates dynamic information regarding the one or more detected objects, where the dynamic information includes characteristics such as, but not limited to, position, speed, and heading, and transmits the dynamic information to the message module 48. The message module 48 packetizes the dynamic information regarding the one or more detected objects and places the dynamic information into a plurality of messages that are in a message format. One example of a message format that may be used is JavaScript Object Notation (JSON), however, other formats may be used as well. The message module 48 transmits the dynamic information regarding the one or more detected objects to the priority queue module 50.

The priority queue module 50 of the one or more servers 14 prioritizes a plurality of messages that represent dynamic information for the detected objects based on a relevance priority metric, where detected objects having a high relevance priority metric are transmitted first to the one or more controllers 20 of the connected vehicle 16. In one non-limiting embodiment, the relevance priority metric is based on a region of interest (ROI) within the scene, a distance between a particular detected object and a point-of-interest, a heading of the particular detected object with respect to the point-of-interest, and a velocity of the particular detected object. Some examples of the point-of-interest include, but are not limited to, an intersection or a pedestrian crossing. The ROI may represent a specific portion of a scene where a particular incident takes place such as, for example, a pedestrian crossing. In one non-limiting embodiment, the predefined metric is determined based on Equation 1, and is expressed as:

$$p_r = \frac{v}{d} \cdot \cos \theta \cdot e^{(\alpha|v - \mu_v|)} \qquad \text{Equation 1}$$

where $p_r$ represents the relevance priority metric, v represents a velocity of the particular detected object, d represents a distance from the particular detected object to the point-of-interest, $\theta$ represents a heading angle with respect to the point-of-interest, $\mu_v$ represents a speed limit of a monitored roadway, e represents Euler's number, and $\alpha$ is a predetermined constant.

The relevance priority metric results in prioritizing detected objects that travel at a faster speed when distance is equal and prioritizes detected object that are closer in distance when speed is equal. The exponential term (Euler's number e) in Equation 1 results in prioritizing detected objects having a speed that deviates significantly from the speed limit of the monitored roadway such as, for example, a vehicle that is stopped or pedestrians. In an embodiment, the relevance priority metric is also based on an urgency of an incident that involves the detected object. The incident may represent an emergency that the detected object is involved with. For example, the incident may be a fire, where the detected object is a fire truck. In another example, the incident may be a medical emergency and the detected object is an ambulance or police car.

The priority queue module 50 of the one or more servers 14 then transmits the plurality of messages that represent dynamic information regarding the one or more detected objects in the environment 8 to the connected vehicle 16. In an embodiment, each of the plurality of messages represent the dynamic information for a single detected object, where each message is transmitted separately to the connected vehicle 16, which reduces the end-to-end latency. However, in the event the available bandwidth is high and the wireless connection between the one or more servers 14 and the connected vehicle 16 is relatively strong, a subset or group of messages including the dynamic information for all the detected objects may be transmitted together instead.

Referring generally to the figures, the disclosed infrastructure-supported perception system provides various technical effects and benefits. Specifically, the infrastructure-supported perception system provides reduced end-toend latency between a sender (i.e., the infrastructure perception sensors) and a receiver (i.e., one of the vehicles) when compared to a system that performs the computer perception tasks in a centralized cloud or by the infrastructure controllers. A reduced end-to-end latency may be especially relevant when the connected vehicle employs ADAS applications, which have a high degree of latency sensitivity.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An infrastructure-supported perception system for connected vehicle applications, wherein the infrastructure-supported perception system comprises:
   at least one infrastructure perception sensors that captures perception data having a reduced resolution and a reduced frame rate, wherein the reduced resolution includes a reduced number of data points for a given frame when compared to the standard resolution and captures data at a lower rate when compared to the standard frame rate;
   at least one controller that is part of a connected vehicle, the at least one controller of the connected vehicle in wireless communication with the at least one infrastructure perception sensor and at least one server, wherein the at least one server is in wireless communication with the at least one infrastructure perception sensor, the at least one controller executing instructions to:
      detect, by at least one object detection algorithm, at least one object represented by the perception data captured by the at least one infrastructure perception sensor;
      receive dynamic information regarding at least one detected object in an environment surrounding the connected vehicle from the at least one server, wherein the dynamic information regarding the at least one detected object is estimated by the at least one server by:
         executing one or more super-resolution algorithms to increase the resolution of the perception data from the reduced resolution to at least the standard resolution;
         executing one or more motion prediction algorithms to interpolate a position of at least one detected object between frames captured at the reduced frame rate to compensate for a reduced number of frames that are captured by the at least one infrastructure perception sensor when compared to the standard frame rate; and prioritizing a plurality of messages that contain the dynamic information for the detected objects based on a relevance priority metric, wherein the at least one detected object having a high relevance priority metric are transmitted first to the at least one controller, and wherein the relevance priority metric is calculated by solving the following equation:

$$p_r = \frac{v}{d} \cdot \cos\theta \cdot e^{(\alpha|v-\mu_v|)}$$

wherein $p_r$ represents the relevance priority metric, v represents the velocity of a selected detected object, d represents the distance from the selected detected object to a point-of-interest, $\theta$ represents the heading angle with respect to the point-of-interest, $\mu_v$ represents the speed limit of a monitored roadway, e represents Euler's number, and $\alpha$ is the predetermined constant, and wherein the relevance priority metric results in prioritizing detected objects that travel at a faster speed when distance is equal and prioritizes detected object that are closer in distance when speed is equal.

2. The infrastructure-supported perception system of claim 1, wherein the standard resolution results in lane-level accuracy when executing at least one object detection and tracking algorithms to detect one or more objects represented by the perception data captured by the at least one infrastructure perception sensors.

3. The infrastructure-supported perception system of claim 1, wherein the or more super-resolution algorithms include a neural network trained for increasing the resolution of roadside objects.

4. The infrastructure-supported perception system of claim 1, wherein the standard frame rate captured by the at least one infrastructure perception sensors results in lane-level accuracy when executing one or more object tracking algorithms to track the detected objects represented by the perception data captured by the at least one infrastructure perception sensor.

5. The infrastructure-supported perception system of claim 1, wherein the dynamic information regarding the at least one detected objects is packetized into a message format.

6. The infrastructure-supported perception system of claim 5, wherein a plurality of messages each contain the dynamic information that corresponds to a single detected object, and wherein each message is transmitted separately.

7. The infrastructure-supported perception system of claim 1, wherein the at least one server execute instructions to:

prioritize a plurality of messages that contain the dynamic information for the detected objects based on the relevance priority metric, wherein the at least one detected object having a high relevance priority metric are transmitted first to the at least one controller.

8. The infrastructure-supported perception system of claim 1, wherein the at least one infrastructure perception sensors is one or more of the following: a camera, a radar sensor, and a LiDAR sensor.

9. An infrastructure-supported perception system for connected vehicle applications, wherein the infrastructure-supported perception system comprises:

at least one infrastructure perception sensors that captures perception data having a reduced resolution and a reduced frame rate, wherein the reduced resolution includes a reduced number of data points for a given frame when compared to the standard resolution and captures data at a lower rate when compared to the standard frame rate;

at least one controllers that is part of a connected vehicle, the at least one controller of the connected vehicle in wireless communication with the at least one infrastructure perception sensor and at least one server, wherein the at least one server are in wireless communication with the at least one infrastructure perception sensor, the at least one controller executing instructions to:

detect, by at least one object detection algorithm, at least one object represented by the perception data captured by the at least one infrastructure perception sensor;

receive dynamic information regarding at least one detected object in an environment surrounding the connected vehicle from the at least one server, wherein the dynamic information regarding the detected object is estimated by the at least one server by:

executing one or more super-resolution algorithms to increase the resolution of the perception data from the reduced resolution to at least the standard resolution, wherein the standard resolution results in lane-level accuracy when executing at least one object detection and tracking algorithms to detect one or more objects represented by the perception data captured by the at least one infrastructure perception sensors;

executing one or more motion prediction algorithms to interpolate a position of at least one detected object between frames captured at the reduced frame rate to compensate for a reduced number of frames that are captured by the at least one infrastructure perception sensors when compared to the standard frame rate; and prioritizing a plurality of messages that contain the dynamic information for the detected objects based on a relevance priority metric, wherein the at least one detected object having a high relevance priority metric are transmitted first to the at least one controller, and wherein the relevance priority metric is calculated by solving the following equation:

$$p_r = \frac{v}{d} \cdot \cos\theta \cdot e^{(\alpha|v-\mu_v|)}$$

wherein $p_r$ represents the relevance priority metric, v represents the velocity of a selected detected object, d represents the distance from the selected detected object to a point-of-interest, $\theta$ represents the heading angle with respect to the point-of-interest, $\mu_v$ represents the speed limit of a monitored roadway, e represents Euler's number, and $\alpha$ is the predetermined constant, and wherein the relevance priority metric results in prioritizing detected objects that travel at a faster speed when distance is equal and prioritizes detected object that are closer in distance when speed is equal.

10. The infrastructure-supported perception system of claim 9, wherein the or more super-resolution algorithms include a neural network trained for increasing the resolution of roadside objects.

11. The infrastructure-supported perception system of claim 9, wherein the standard frame rate captured by the at least one infrastructure perception sensors results in lane-level accuracy when executing one or more object tracking algorithms to track the detected objects represented by the perception data captured by the at least one infrastructure perception sensors.

12. The infrastructure-supported perception system of claim 9, wherein the dynamic information regarding the at least one detected objects is packetized into a message format.

13. The infrastructure-supported perception system of claim 12, wherein a plurality of messages each contain the dynamic information that corresponds to a single detected object, and wherein each message is transmitted separately.

14. An infrastructure-supported perception system for connected vehicle applications, wherein the infrastructure-supported perception system comprises:

at least one infrastructure perception sensor that captures perception data having a reduced resolution and a reduced frame rate, wherein the reduced resolution includes a reduced number of data points for a given frame when compared to the standard resolution and captures data at a lower rate when compared to the standard frame rate, wherein the standard frame rate captured by the at least one infrastructure perception sensor results in lane-level accuracy when executing one or more object tracking algorithms to track the detected objects represented by the perception data captured by the at least one infrastructure perception sensor;

at least one controller that is part of a connected vehicle, the at least one controllers of the connected vehicle in wireless communication with the at least one infrastructure perception sensors and at least one server, wherein the at least one server is in wireless communication with the at least one infrastructure perception sensors, the at least one controller executing instructions to:

detect, by at least one object detection algorithm, at least one object represented by the perception data captured by the at least one infrastructure perception sensor;

receive dynamic information regarding at least one detected objects in an environment surrounding the connected vehicle from the at least one servers, wherein the dynamic information regarding the at least one detected object is estimated by the at least one servers by:

executing one or more super-resolution algorithms to increase the resolution of the perception data from the reduced resolution to at least the standard resolution, wherein the standard resolution results in lane-level accuracy when executing at least one object detection and tracking algorithms to detect one or more objects represented by the perception data captured by the at least one infrastructure perception sensors;

executing one or more motion prediction algorithms to interpolate a position of at least one detected objects between frames captured at the reduced frame rate to compensate for a reduced number of frames that are captured by the at least one infrastructure perception sensors when compared to the standard frame rate; and prioritizing a plurality of messages that contain the dynamic information for the detected objects based on a relevance priority metric, wherein the at least one detected object having a high relevance priority metric are transmitted first to the at least one controller, and wherein the relevance priority metric is calculated by solving the following equation:

$$p_r = \frac{v}{d} \cdot \cos\theta \cdot e^{(\alpha|v - \mu_v|)}$$

wherein $p_r$ represents the relevance priority metric, v represents the velocity of a selected detected object, d represents the distance from the selected detected object to a point-of-interest, $\theta$ represents the heading angle with respect to the point-of-interest, $\mu_v$ represents the speed limit of a monitored roadway, e represents Euler's number, and $\alpha$ is the predetermined constant, and wherein the relevance priority metric results in prioritizing detected objects that travel at a faster speed when distance is equal and prioritizes detected object that are closer in distance when speed is equal.

* * * * *